US009238174B2

(12) United States Patent
Hoffman et al.

(10) Patent No.: US 9,238,174 B2
(45) Date of Patent: Jan. 19, 2016

(54) METHOD AND APPARATUS FOR VIRTUAL LOCATION-BASED SERVICES

(75) Inventors: Steven Samuel Hoffman, San Francisco, CA (US); Naomi Kokubo, San Francisco, CA (US)

(73) Assignee: Lavamind LLC, San Francisco, CA (US)

( * ) Notice: Subject to any disclaimer, the term of this patent is extended or adjusted under 35 U.S.C. 154(b) by 29 days.

(21) Appl. No.: 13/483,008

(22) Filed: May 29, 2012

(65) Prior Publication Data
US 2012/0238358 A1  Sep. 20, 2012

Related U.S. Application Data

(63) Continuation of application No. 12/118,553, filed on May 9, 2008, now Pat. No. 8,190,733.

(60) Provisional application No. 61/034,451, filed on Mar. 6, 2008, provisional application No. 60/974,438, filed (Continued)

(51) Int. Cl.
A63F 13/30 (2014.01)
G06Q 30/00 (2012.01)
G06N 3/00 (2006.01)
G06F 3/0481 (2013.01)
H04L 29/06 (2006.01)
G06Q 30/02 (2012.01)
G06Q 50/10 (2012.01)

(52) U.S. Cl.
CPC ............ *A63F 13/12* (2013.01); *G06F 3/04815* (2013.01); *G06N 3/006* (2013.01); *G06Q 30/00* (2013.01); *G06Q 30/02* (2013.01); *G06Q 50/10* (2013.01); *H04L 67/42* (2013.01)

(58) Field of Classification Search
CPC .... G06Q 30/00; H04L 67/42; G06F 3/04815; A63F 13/12; G07F 17/3225; G07F 17/3234; G07F 17/329
USPC ................ 463/40–42, 1–6, 25, 29, 31–33, 37
See application file for complete search history.

(56) References Cited

U.S. PATENT DOCUMENTS 6,106,395 A  8/2000  Begis
6,208,659 B1  3/2001  Govindarajan et al.

(Continued)

OTHER PUBLICATIONS

Dinesh C. Verma, *Content Distribution Networks: An Engineering Approach*, John Wiley & Sons, 2002, pp. 81-82.

(Continued)

*Primary Examiner* — Ronald Laneau
*Assistant Examiner* — Ross Williams
(74) *Attorney, Agent, or Firm* — Pillsbury Winthrop Shaw Pittman LLP

(57) ABSTRACT

The present invention relates generally to the field of computer and network software, and more particularly it relates to a method and apparatus for providing virtual goods and/or on-line services based on a user's virtual location while surfing the web. According to certain aspects, the invention allows interactive objects, virtual goods and on-line services to be automatically provided to users when they visit predetermined partner sites or perform some predetermined on-line activity. According to other aspects, the invention automatically provides parallel destinations for predetermined partner sites that only users of the system can visit, and where such users can receive virtual goods and on-line services, among other content.

13 Claims, 8 Drawing Sheets

Related U.S. Application Data on Sep. 21, 2007, provisional application No. 60/955,144, filed on Aug. 10, 2007, provisional application No. 60/955,137, filed on Aug. 10, 2007, provisional application No. 60/941,258, filed on May 31, 2007, provisional application No. 60/941,250, filed on May 31, 2007, provisional application No. 60/941,261, filed on May 31, 2007, provisional application No. 60/940,955, filed on May 30, 2007.

(56) References Cited

U.S. PATENT DOCUMENTS

| | | |
|---|---|---|
| 6,229,533 B1 | 5/2001 | Farmer et al. |
| 6,268,872 B1 | 7/2001 | Matsuda et al. |
| 6,314,475 B1 | 11/2001 | Collin et al. |
| 6,612,932 B2 | 9/2003 | Stern |
| 6,618,593 B1 | 9/2003 | Drutman et al. |
| 6,711,581 B2 | 3/2004 | Rebane |
| 6,729,884 B1 | 5/2004 | Kelton et al. |
| 6,746,332 B1* | 6/2004 | Ing et al. ............ 463/42 |
| 6,749,511 B2 | 6/2004 | Day |
| 6,847,940 B1 | 1/2005 | Shelton |
| 6,879,994 B1 | 4/2005 | Matsliach et al. |
| 7,249,139 B2 | 7/2007 | Chuah et al. |
| 7,412,422 B2 | 8/2008 | Shiloh |
| 7,433,834 B2 | 10/2008 | Joao |
| 7,455,586 B2 | 11/2008 | Nguyen et al. |
| 7,480,727 B2 | 1/2009 | Domschitz |
| 7,529,797 B2 | 5/2009 | Tseng et al. |
| 7,685,204 B2 | 3/2010 | Rogers |
| 7,739,357 B2 | 6/2010 | Gould |
| 7,802,200 B1 | 9/2010 | Siegel |
| 7,844,590 B1* | 11/2010 | Zwicky et al. ............ 707/706 |
| 7,901,288 B2 | 3/2011 | Barsness et al. |
| 7,925,703 B2 | 4/2011 | Dinan et al. |
| 8,002,617 B1 | 8/2011 | Uskela et al. |
| 8,105,153 B2 | 1/2012 | Buecheler et al. |
| 9,026,033 B2 | 5/2015 | Khedouri et al. |
| 9,063,633 B2 | 6/2015 | Rajasingham |
| 2002/0013174 A1 | 1/2002 | Murata |
| 2002/0023178 A1 | 2/2002 | Strasnick et al. |
| 2002/0052925 A1 | 5/2002 | Kim et al. |
| 2002/0059120 A1 | 5/2002 | Milton |
| 2002/0065136 A1 | 5/2002 | Day et al. |
| 2002/0065826 A1 | 5/2002 | Bell et al. |
| 2002/0068631 A1 | 6/2002 | Raverdy et al. |
| 2002/0094870 A1 | 7/2002 | Murray |
| 2002/0099818 A1 | 7/2002 | Russell et al. |
| 2002/0120501 A1 | 8/2002 | Bell et al. |
| 2002/0178060 A1* | 11/2002 | Sheehan ............ 705/14 |
| 2003/0014423 A1 | 1/2003 | Chuah et al. |
| 2003/0156135 A1 | 8/2003 | Lucarelli et al. |
| 2003/0191816 A1 | 10/2003 | Landress et al. |
| 2004/0058694 A1 | 3/2004 | Mendiola et al. |
| 2004/0122895 A1 | 6/2004 | Gourraud |
| 2005/0086605 A1 | 4/2005 | Ferrer et al. |
| 2005/0137015 A1 | 6/2005 | Rogers et al. |
| 2005/0174975 A1 | 8/2005 | Mgrdechian et al. |
| 2006/0183551 A1* | 8/2006 | Prudent ............ 463/42 |
| 2006/0282426 A1 | 12/2006 | Spears |
| 2006/0282530 A1 | 12/2006 | Klein et al. |
| 2007/0030824 A1 | 2/2007 | Ribaudo et al. |
| 2007/0033155 A1 | 2/2007 | Landsman |
| 2007/0037574 A1 | 2/2007 | Libov et al. |
| 2007/0043583 A1 | 2/2007 | Davulcu et al. |
| 2007/0043646 A1 | 2/2007 | Morris |
| 2007/0067441 A1 | 3/2007 | Pomerantz |
| 2007/0078962 A1 | 4/2007 | Donnelli et al. |
| 2007/0150537 A1 | 6/2007 | Graham |
| 2007/0150603 A1 | 6/2007 | Crull et al. |
| 2007/0156521 A1 | 7/2007 | Yates |
| 2007/0197296 A1* | 8/2007 | Lee ............ 463/42 |
| 2007/0203828 A1 | 8/2007 | Jung et al. |
| 2007/0208751 A1 | 9/2007 | Cowan et al. |
| 2007/0225070 A1* | 9/2007 | Zahorik et al. ............ 463/29 |
| 2007/0271273 A1* | 11/2007 | Cradick et al. ............ 707/10 |
| 2007/0294351 A1 | 12/2007 | El-Emam |
| 2008/0010372 A1 | 1/2008 | Khedouri et al. |
| 2008/0046363 A1 | 2/2008 | Ali et al. |
| 2008/0046458 A1 | 2/2008 | Tseng et al. |
| 2008/0059575 A1 | 3/2008 | Malobrodsky et al. |
| 2008/0091692 A1* | 4/2008 | Keith et al. ............ 707/100 |
| 2008/0097851 A1 | 4/2008 | Bemmel et al. |
| 2008/0097871 A1 | 4/2008 | Williams et al. |
| 2008/0102947 A1 | 5/2008 | Hayes |
| 2008/0104496 A1 | 5/2008 | Williams et al. |
| 2008/0126206 A1 | 5/2008 | Jarrell |
| 2008/0140650 A1 | 6/2008 | Stackpole |
| 2008/0160877 A1 | 7/2008 | Lipman |
| 2008/0215975 A1 | 9/2008 | Harrison et al. |
| 2008/0215995 A1 | 9/2008 | Wolf |
| 2008/0220876 A1* | 9/2008 | Mehta et al. ............ 463/42 |
| 2008/0262910 A1 | 10/2008 | Altberg et al. |
| 2008/0262911 A1 | 10/2008 | Altberg et al. |
| 2009/0152349 A1 | 6/2009 | Bonev et al. |
| 2009/0164275 A1 | 6/2009 | Chen et al. |
| 2009/0198666 A1 | 8/2009 | Winston |
| 2009/0241035 A1 | 9/2009 | Tseng et al. |
| 2009/0254459 A1 | 10/2009 | Williams |
| 2009/0271212 A1 | 10/2009 | Savjani et al. |
| 2009/0292595 A1 | 11/2009 | Tonnison et al. |
| 2011/0167481 A1 | 7/2011 | Ganz |
| 2011/0225069 A1 | 9/2011 | Cramer et al. |
| 2011/0276965 A1 | 11/2011 | Nonoyama et al. |
| 2011/0282646 A1 | 11/2011 | Bill |
| 2012/0015668 A1 | 1/2012 | Mgrdechian |
| 2012/0015724 A1 | 1/2012 | Ocko et al. |

OTHER PUBLICATIONS

Johnson, "Black Sun Adds Tools to Manage VR Worlds", Electronic Engineering Times, n926, pp. 152-154, Nov. 4, 1996.

* cited by examiner

METHOD AND APPARATUS FOR VIRTUAL LOCATION-BASED SERVICES

CROSS-REFERENCE TO RELATED APPLICATIONS

The present application is a continuation of U.S. application Ser. No. 12/118,553, filed May 9, 2008, now U.S. Pat. No. 8,190,733, which claims priority to U.S. Provisional Application No. 60/940,955, filed May 30, 2007, U.S. Provisional Application Nos. 60/941,250, 60/941,258 and 60/941,261, all filed May 31, 2007, U.S. Provisional Application Nos. 60/955,137 and 60/955,144, both filed Aug. 10, 2007, U.S. Provisional Application No. 60/974,438, filed Sep. 21, 2007, and U.S. Provisional Application No. 61/034,451 filed Mar. 6, 2008, the contents of all such applications are incorporated herein by reference in their entirety.

FIELD OF THE INVENTION

The present invention relates to computer and network software, and more particularly it relates to a method and apparatus for providing virtual goods and/or on-line services based on a user's virtual location while surfing the web.

BACKGROUND OF THE RELATED ART

There has been a recent surge in "virtual world" technologies that allow users to assume virtual identities (e.g. avatars) and possibly also to interact with other users online, such as Second Life, Habbo, Zwinky, Gaia, Club Penguin, Webkinz. These are typically accessed via dedicated websites and subscriptions, and are typically closed systems (i.e. a user in one virtual community cannot directly interact with users in other virtual communities). These online communities sometimes further offer virtual items that can be bought and sold within their virtual worlds, such as virtual furniture, virtual clothing, virtual real estate, etc.

One problem with existing "virtual world" products is that they typically require users to go to specific online destinations to acquire and use these virtual items rather than allowing users to pick up and use virtual items while browsing any website on the Internet. Accordingly, it would be desirable if a system was provided in which users could obtain and use virtual objects and virtual goods while they surf anywhere on the worldwide web.

U.S. Pat. No. 8,108,459, commonly owned by the present assignee, the contents of which being incorporated herein by reference in their entirety, dramatically advanced the state of the art by providing a method and apparatus for distributing virtual objects such as Virtual Collectibles. According to an aspect of that invention, users can accumulate Virtual Collectibles in the process of casually surfing the web. The system detects what site(s) the user is visiting and determines whether to reward the user with a Virtual Collectible when the user enters or links to a predetermined URL, such as the URL of a partner website. By entertaining the user in the process of visiting a partner website, the user is more likely to remember and favorably view the partner and its products and services.

According to further aspects of the commonly owned patent, the system provides virtual world(s) where Virtual Collectibles can be displayed, used, and traded, and where users can interact with other users. Although this functionality by itself vastly improves upon conventional means of promoting on-line activities, additional improvements are possible by further leveraging the discoveries and functionalities of the commonly owned patent, including improvements that even further overcome the above-described and other disadvantages.

For example, while the virtual world(s) of the commonly owned patent allows users to interact with Virtual Collectibles and/or other users in entertaining ways, it would be desirable if the principles of the invention of the commonly owned patent could be extended to further encourage users to spend more time at partner sites, and to perform more activities while at partner sites, and to be further entertained while casually surfing the web.

SUMMARY OF THE INVENTION

The present invention relates generally to the field of computer and network software, and more particularly it relates to a method and apparatus for providing virtual goods and/or on-line services based on a user's virtual location while surfing the web. According to certain aspects, the invention allows interactive objects, virtual goods and on-line services to be automatically provided to users when they visit predetermined partner sites or perform some predetermined on-line activity. According to other aspects, the invention automatically provides parallel destinations for predetermined partner sites that only users of the system can visit, and where such users can receive virtual goods and on-line services, among other content.

In furtherance of these and other aspects, a method according to the invention includes monitoring a user's virtual location on the web; and providing services to the user depending on (a) the monitored virtual location, and (b) the monitored activities of the user on a specific virtual location. In alternative embodiments, a method according to the invention includes identifying a partner web site that serves content to first and second users that are simultaneously accessing it from respective hosts; configuring the first user's host to report the first user's access of the partner web site to a server separate from the partner web site, wherein the second user's host is not similarly configured; and serving additional content associated with a service to the first user from the server, wherein the first user receives the service and the second user does not receive the service. In still further alternative embodiments, a method according to the invention includes reporting a user's presence at a first virtual location on the web to a server separate from the first virtual location; reporting the user's presence at a second virtual location on the web the server, which is also separate from the second virtual location; configuring the server to provide a service to users who access the first virtual location, wherein the second virtual location is not similarly configured; serving additional content associated with a service to the user from the server in response to the report of the user's presence at the first virtual location; and preventing the provision of the service to the user from the server in response to the report of the user's presence at the second virtual location.

DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
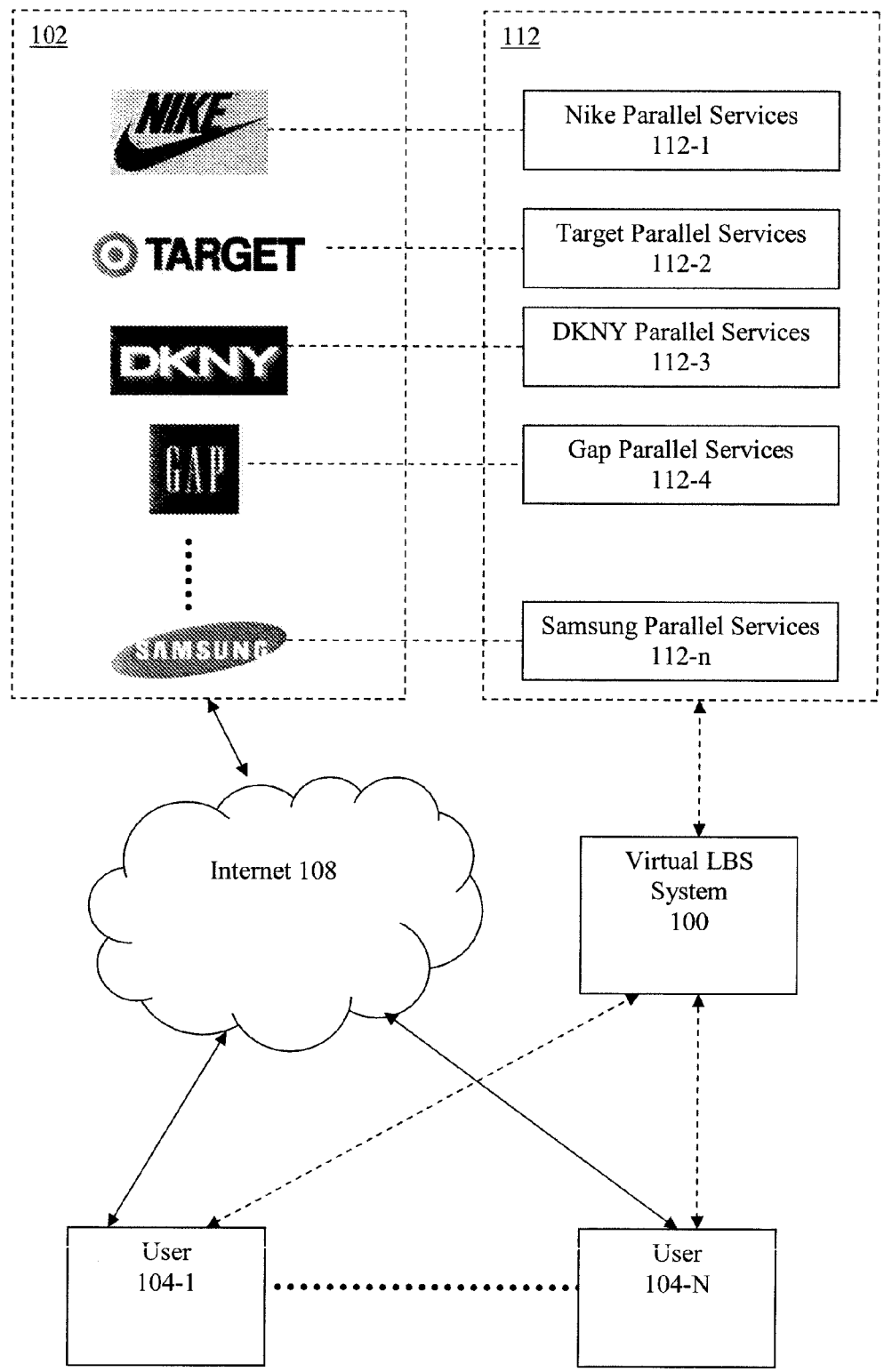
FIG. 1 is a block diagram illustrating the basic concepts of providing virtual location-based goods and services according to the invention.

As generally shown in FIG. 1, the present invention can be embodied in a system 100 that provides virtual location-based services associated with advertisers and sponsors 102 to users 104. According to some aspects, system 100 automatically provides parallel services 112 associated with advertisers and sponsors (i.e. partners) 102 such that users 104 can automatically receive services and perform activities when they access websites of sponsors 102 via Internet 108. As will be explained in more detail below, services 112 can be interactive objects, virtual goods, games, on-line services, etc. that are embedded within or overlaid on top of regular website content of partners 102. Additionally or alternatively, services 112 can be parallel virtual worlds or spaces that are separate from and/or replace regular website content of partners 102 when users visit such websites, either automatically or at the option of such users.

According to some aspects, the present invention leverages and expands on the discoveries and functionalities of the commonly owned patent. For example, the commonly owned patent provides an interactive system that distributes virtual objects (i.e. Virtual Collectibles) to users while they are casually surfing the web. Each Virtual Collectible consists of one or more attributes. Attributes may determine the virtual object's appearance, behavior, value, virtual location, ownership, etc. Virtual Collectibles are virtual objects that are potentially unique.

According to other aspects of the commonly owned patent, Virtual Collectibles are advantageous over traditional points because they make the users who own them appear more appealing to other users in a rules-based system. This can be achieved in a number of different ways. For example, each user may have an avatar that represents them as they navigate in the system. Each user may also own other Virtual Collectibles that accessorize the avatar, such as clothing, hats, and facial features. These Virtual Collectibles may attach to a user's avatar or may be associated with a user's profile, virtual home or virtual space. Examples include a user collecting vehicles, weapons, medicine, furniture, mini-games, planets, badges, etc. Owning these Virtual Collectibles can enhance the user's status within the game or social network. By collecting highly sought-after Virtual Collectibles and displaying them for other users to see, a user can obtain recognition of achievement from the community. Highly decorative or rare Virtual Collectibles not only act as status symbols, but they can also be used to personalize the users' avatars, profiles or online virtual spaces. By displaying these Virtual Collectibles or arranging them in a unique combination, users can express and personalize their appearance, as well as decorate their virtual spaces in a pleasing manner.

According to some additional aspects of the commonly owned patent, certain Virtual Collectibles can be made more difficult to obtain (e.g. rarer, harder to find, less frequently available, or more expensive), and therefore some Virtual Collectibles can be effectively more desirable than others. As a result, the commonly owned patent allows control over the visual appeal and desirability of the Virtual Collectibles not only by thoughtful aesthetic design but also by controlling the scarcity of the Virtual Collectibles. Controlling the desirability of the Virtual Collectibles enables developers to enhance the entertainment value of the system, as well as enabling partners and sponsors to have a greater control over targeting audiences. For example, where a user's online identity is represented by an avatar, these may be customized by other Virtual Collectibles such as clothing, accessories, hairstyles, etc., certain or all of which can be made more appealing by being more difficult to obtain.

Moreover, according to some further aspects of the commonly owned patent, Virtual Collectibles can be branded and carry the logos or identifying marks of partners and sponsors. By associating Virtual Collectibles with specific marks and brands, the system can heighten user interest, foster brand recognition and loyalty, and give partners and sponsors the ability to market their products and services more directly. For example, a Virtual Collectible can bear the logo of a sponsor, such as a spaceship Virtual Collectible bearing the Ford logo. By making the Virtual Collectible visually appealing and/or difficult to obtain, greater brand recognition and loyalty can be promoted. Moreover, acquiring such a highly appealing Virtual Collectible can be tied to a sponsor's goal of promoting its products, such as making it available as a prize to one or more users for viewing a promotional video at a dedicated URL in its website.

According to other aspects, the commonly owned patent further provides mechanisms to allow users to interact with each other in virtual spaces, such as personal chat rooms or chat rooms associated with partner sites. Generally, however, the commonly owned patent provides mechanisms that drive traffic to partner sites by monitoring users' on-line activities and rewarding users with certain Virtual Collectible(s) when they visit partner sites.

According to some aspects, the present invention leverages and expands on the visit-reward techniques of the commonly owned patent in new and useful ways. For example, the present invention offers virtual goods and/or on-line services and benefits instead of or in addition to just Virtual Collectibles to users who visit partner sites. For example, rather than simply distributing certain Virtual Collectibles to visitors of partner sites, the invention allows for further provision of other virtual goods, on-line services, and other benefits, which encourage users to spend more time on the partner sites and perform more activities there, all while casually surfing the web as usual.

According to some additional aspects of the invention, the system can provide superior on-line advertising revenue opportunities as compared to traditional banner ads and click-through advertising. For example, visitors who end up on partner sites through such ads and mechanisms are typically pre-disposed or compelled by the system-integrated advertisement to perform specific actions designed and encouraged by them. In contrast, in addition to or alternatively to directing visitors to their sites with such pre-dispositions, the invention is able to capture and keep visitors on-site longer who were otherwise just casually surfing the web.

In addition, the present invention allows personnel associated with advertiser and partner websites to configure the virtual spaces and virtual goods and on-line services that are provided, and how visitors are rewarded for performing certain actions on their sites via the virtual goods and on-line services.

A method and system of providing location-based virtual goods and services according to certain aspects of the invention will now be described in detail beginning with FIG. 2.

Figure 2:
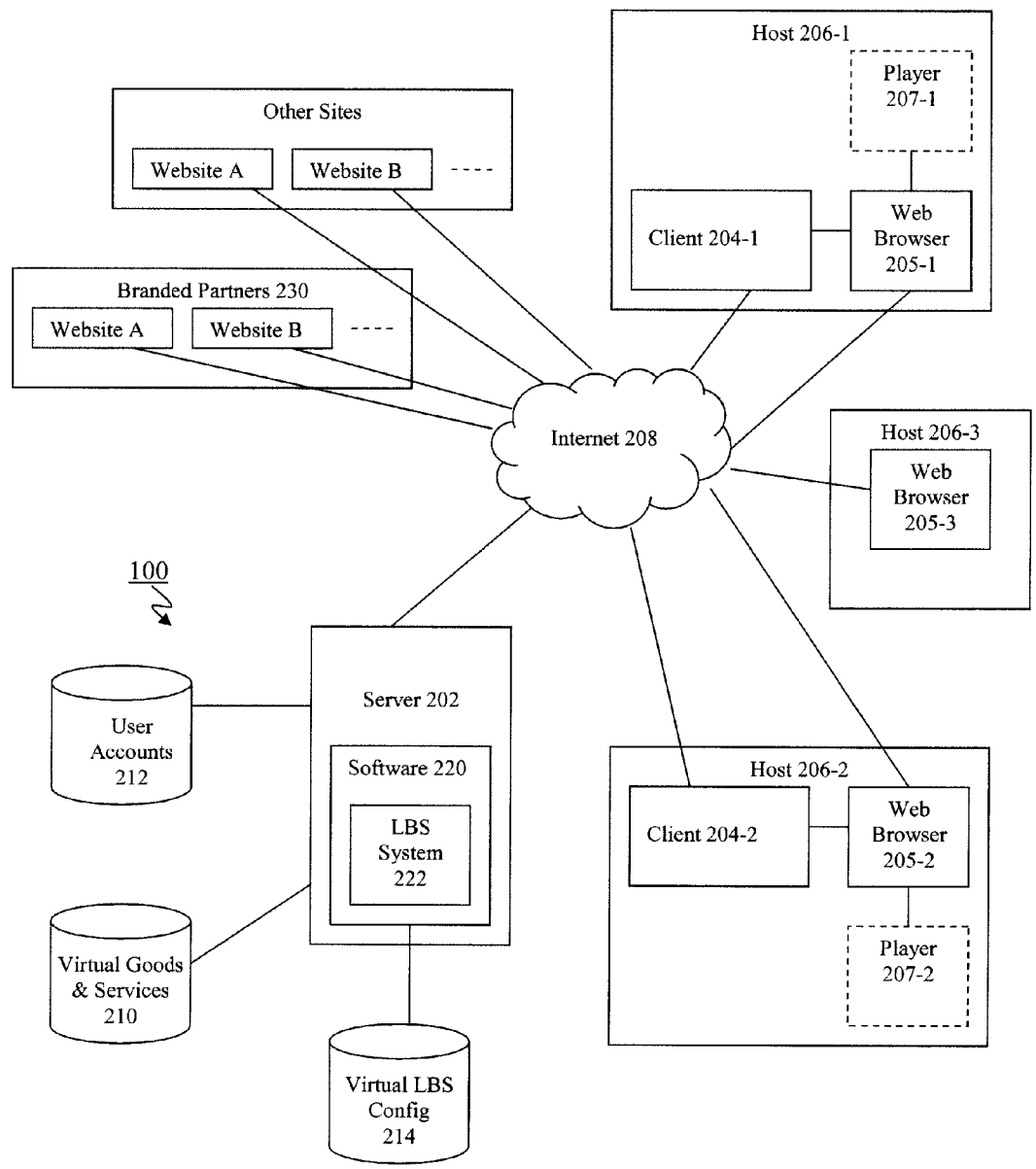
FIG. 2 is a block diagram of a virtual location-based services distribution system according to aspects of the invention.

As shown in FIG. 2, a system 100 according to the invention includes server 202 that communicates with clients 204-1, 204-2, etc. having associated hosts 206-1, 206-2, etc. via Internet 208. In embodiments, server 202 can further communicate with hosts (e.g. 206-3) that do not have clients. In general operation, server 202 provides virtual goods and services to users based on their virtual location communicated by clients 204 and configurations stored in database 214.

Server 202 can be implemented by one or more server computers such as those available from Sun, HP, BEA, etc. and associated server software such as that available from Microsoft, BEA, Sun, Linux, Unix, Apache, etc. As shown in FIG. 2, server 202 hosts and maintains a database 210 of virtual goods and services and database 212 of user accounts. It further includes associated software 220 comprising, for example, operating system(s), web server(s), database server(s), and other server software that has been configured with functionality to be described in detail herein, as well as in the commonly owned patent. According to aspects of the invention, software 220 at least includes virtual location-based services system 222 that determines what virtual goods and/or services to provide to users, and/or control attributes thereof, based on the users' on-line location and Virtual LBS configurations 214.

In embodiments, server 202 maintains a list of Virtual Collectibles belonging to individual users in user accounts database 212, and/or credits, points or other real or virtual currency that can be redeemed or exchanged for Virtual Collectibles. It should be noted that server 202 can maintain other conventional user account information such as usernames, passwords, contact information, etc., either in database 212 or other locally or remotely accessible storages.

Database 210 is maintained by server 202 to include virtual goods and services that can be provided to users, and can include Virtual Collectibles, interactive objects, on-line services, communication services, video and media services, news and information services, games, parallel virtual worlds or spaces, e-commerce objects, etc.

Database 214 is maintained by server 202 to generally include configurations of how and when virtual goods and services can be provided to users, and can include pointers, rules and/or configurations regarding the provision and rendering of virtual goods and services.

It should be further noted that the depiction of separate storage 210, 212, and 214 for virtual goods and services, user accounts, and configurations, respectively, is intended to be representative rather than structural, and that many different forms of local, remote, online, offline, permanent and temporary types of storage are possible, either singly or in combination.

According to certain aspects of the invention to be described in more detail below, virtual goods and services are provided by server 202 to users having clients 204 based on the users' on-line activity, including their virtual location associated with partners 230 (e.g. www.ford.com, www.coke.com, etc.) who each have one or more websites accessible by browsers 205. As further shown in FIG. 2, users can also access other websites in addition to partner websites 230.

Hosts 206 are generally any type of computing device a person can now or in the future use to access the Internet or other public network, and which can host at least a client application 204 and Internet access hardware (not shown) and software such as a browser 205. In an example where host 206 is implemented by a personal computer such as a Mac, PC, notebook or desktop computer, host 206 typically includes an operating system such as Windows or Mac OS, a browser application such as Windows Explorer or Mozilla Firefox, and network access hardware such as a wired or wireless modem. Hosts 206 further preferably include graphical displays (e.g. one or more LCD screens) and I/O devices (e.g. keyboard, mouse, keypad, scroll wheels, microphone, speakers, video or still camera, etc.) for providing a user interface within the operating system and communicating with client application 204. Hosts 206 are not limited to personal computers, but can include cellular phones, personal digital assistants (PDAs), game systems (e.g. Playstation, Wii, Xbox, etc.) or other devices, and those skilled in the art will understand how implementation details can be changed based on the particular type of host device.

Clients 204 are software applications that reside on the hosts and typically execute under the host operating system. The client software application 204 can be either a standalone application, such as a game interface that occupies a large portion of the computer screen when in use, a plug-in that is embedded into another application such as a web browser and occupies very little screen space, and/or other type of application and/or screen configuration. In general operation to be described below in more detail, the client application monitors the user's on-line behavior, such as the URLs that the user is visiting via browser 205. It sends this information over the Internet to the server, which in turn uses it to makes decisions as to whether to make one or more virtual goods and services available to the user based on the user's behavior.

The client application 204 also preferably provides a graphical interface using the display and I/O devices of host 206 by which the user navigates through, and interacts with other users in, virtual world(s) maintained and hosted by the system. As will be described in more detail below, the user may initiate an event requiring server attention, such as a trade request, from the interface. The user may also interact with other users using chat and other conventional and new online communication mechanisms, including but not limited to voice and video communications, hosted by server 202 and within or without the graphical interface provided by the client application. In embodiments, the graphical interface provides a graphical representation of other users in the form of avatars, and can also display the Virtual Collectibles that the user or other users own, either alone or together with their respective avatars.

According to further aspects of the invention, as will become more apparent from the descriptions below, client application 204 also allows users to interact with virtual objects, interactive objects, games, and services that are provided in accordance with on-line activities as determined by server 202.

In one example implementation shown in FIG. 2, where host 206 is a laptop or desktop personal computer, client application 204 is an ActiveX control, browser plug-in, C++ application, Java application, Flash application and/or any combination thereof or a similar technology, that operates with browser 205, and has at least the functionality described above and in the commonly owned patent, and to be described in more detail below. Host 206 further includes an optional multimedia player 207 such as a Flash Player for use in displaying multimedia content provided by the invention in a multimedia interface. Those skilled in the art will understand how to implement the principles of the invention using such conventional mechanisms after being taught by the below detailed descriptions of the functionality provided by server 202 and client 204, as well as the details in the commonly owned patent.

Internet 208 is, for example, the public Internet, but can further or alternatively include any combination of wired and wireless networks, public and private, that are traversed by users who seek access to content on the public Internet, as will be appreciated by those skilled in the art. As should be further understood, sites of partners 230 and other sites shown in FIG. 2 are websites that are publicly accessible via Internet 208 and the World Wide Web and protocols such as IP and http, and are hosted by web servers, servers and databases as understood by those skilled in the art.

It should be noted that the configuration illustrated in FIG. 2 is intended to be illustrative and not limiting, and those skilled in the art will appreciate various alternative configurations, topologies, etc. For example, while only one server 202 is shown, there may be many servers 202, either in the same location and/or at the same network address, and/or distributed across many locations and/or network addresses. Moreover, server 202, partner 230 sites and other sites, and hosts 206 are typically all remotely located from each other, both physically and with respect to different network addresses such as IP addresses. Many other alternatives are possible, as will become apparent to those skilled in the art.

Figure 3:
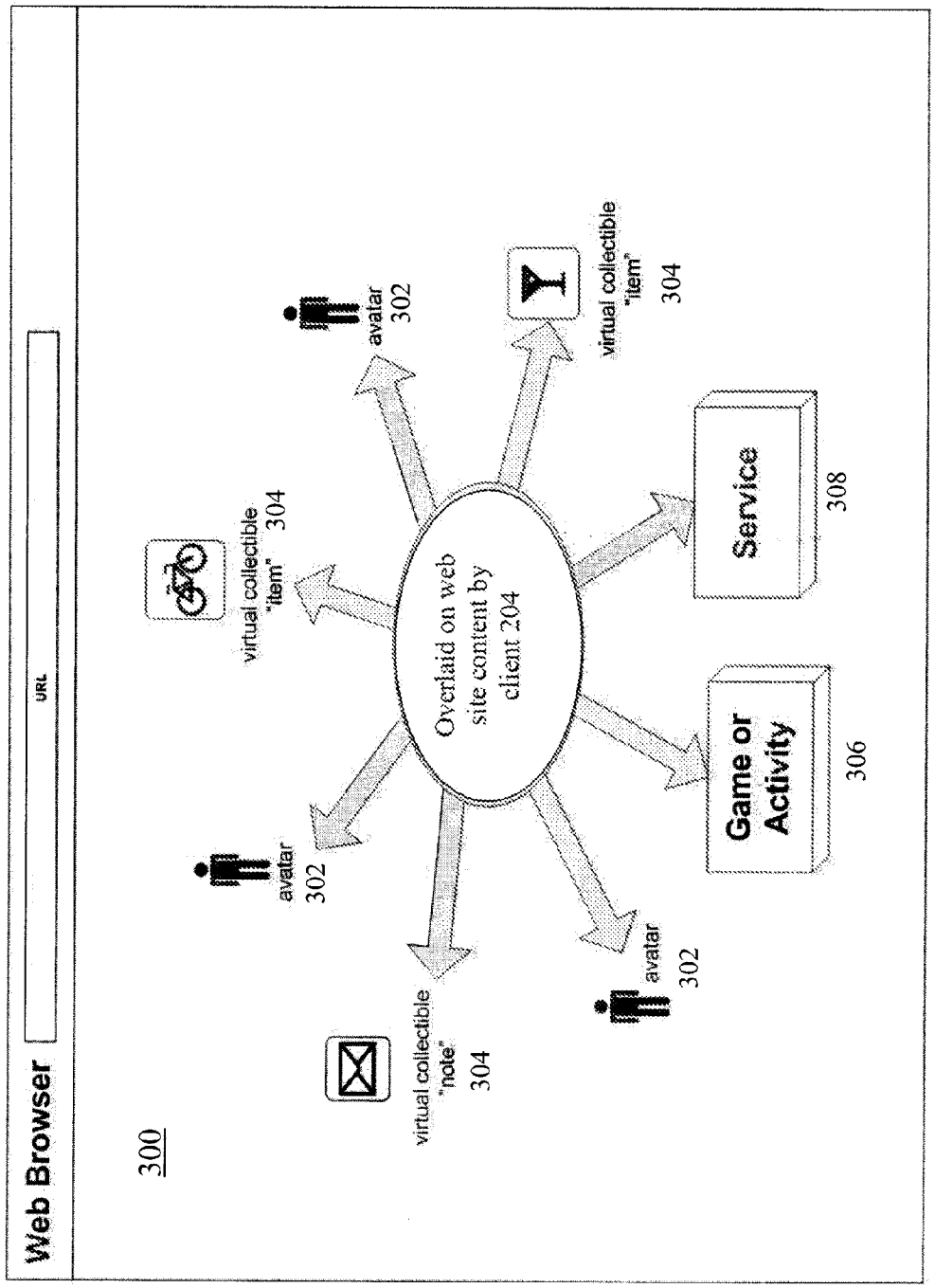
FIGS. 3 and 4 are representations of screen shots illustrating how virtual location-based goods and services can be provided using embedded/overlaid content or parallel destinations, respectively.

Certain broad aspects of providing virtual goods and services based on virtual locations according to embodiments of the invention are illustrated in FIG. 3. As shown in FIG. 3, some embodiments of the invention allow virtual objects and services to be overlaid on website content (e.g. web page) 300 of partners 230 that is ordinarily rendered for display by a web browser. These virtual objects can include avatars 302, virtual collectibles 304, games or activities 306 and on-line services 308. The mechanisms for displaying such objects and providing such services are described in the commonly owned patent and/or will become apparent from the descriptions herein.

Virtual Collectibles 304 can include those described in detail in the commonly owned patent, such as graphical objects (e.g. avatar clothing and attributes, accessories, virtual furniture, etc.), animations (e.g. barking dog, flying spaceship, etc.), games and other interactive objects.

Avatars 302 are typically personalized by each user, and in some respects can be considered Virtual Collectibles themselves. As described in the commonly owned patent and further herein, avatars 302 can be associated with users of the system, and can denote an on-line presence of such users. It should be noted, however, that avatars 302 can also be associated with personnel of partner sites 230 or controlled by the system using scripts and/or artificial intelligence. As such they can interact with users of the system to provide support, direct users to specific pages of interest, inform users about special promotions, act as a host who conducts games and events, etc. The avatars 302 can also be a game object that users can play with and interact with.

Games or activities 306 can include puzzles, mazes, multimedia interactions between users' avatars (e.g. sword fights, tossing a ball, firing weapons and dodging fire, etc.), trivia games, arcade games, word games, social games, games of chance, games of skill, interactive toys and objects, virtual environment games, turn-based games, real-time games, message-based games, web-browsing games, etc. Some aspects of games and activities that can be provided in embodiments of the invention are described in co-pending application Ser. No. 12/111,916, the contents of which are incorporated by reference herein. Other aspects will become apparent from the descriptions herein.

On-line services 308 can include bulletin boards, voice chat, blogs, classifieds, e-commerce, messaging, games, advertising, file sharing, financial services, mobile services, photos, music, radio, live broadcasts, news and information, job matchmaking, online dating, social networking, search, retail, consulting services, etc.

Figure 4:
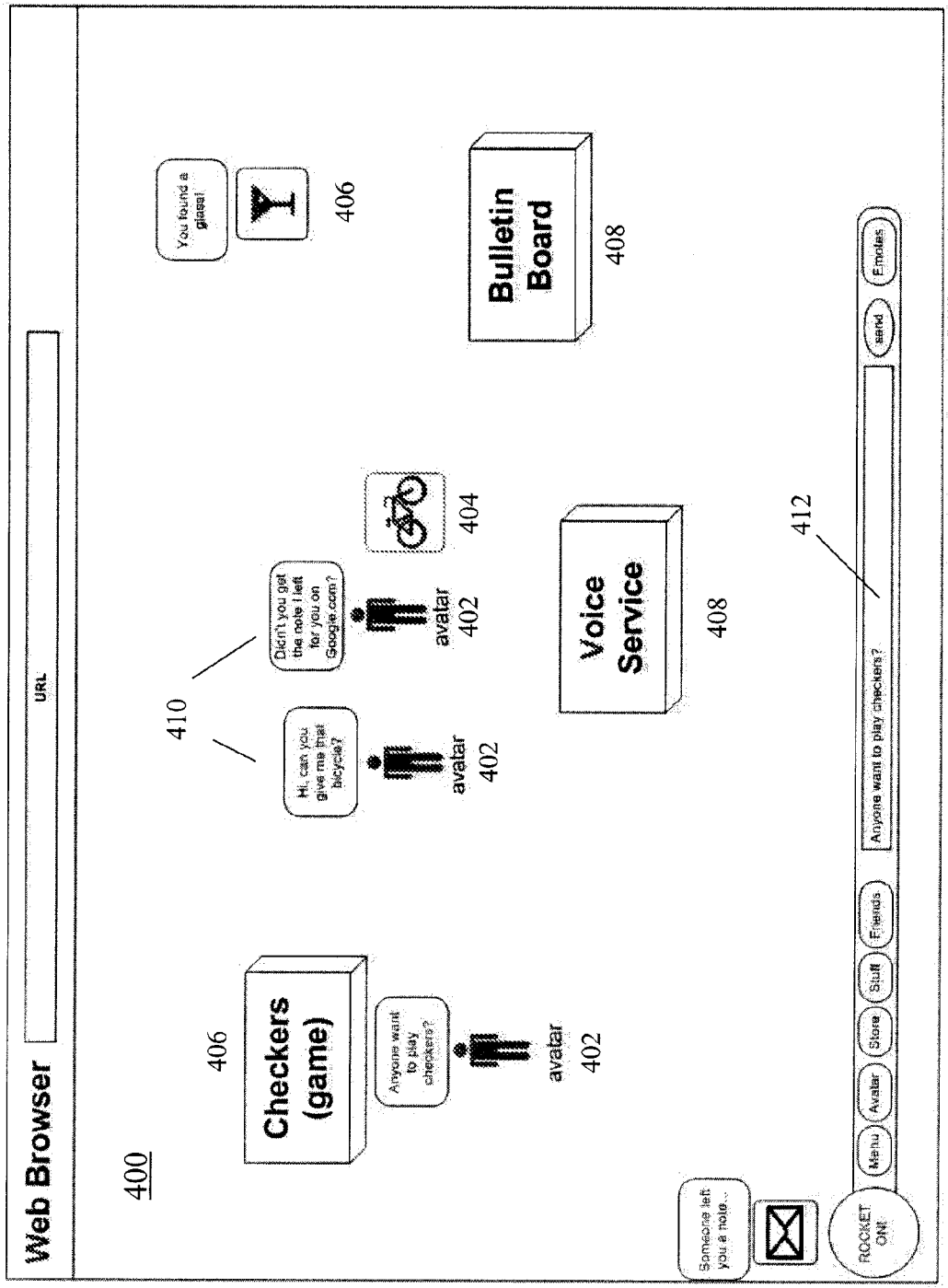

Certain alternative or additional aspects of providing virtual goods and services based on virtual locations according to embodiments of the invention are illustrated in FIG. 4. As shown in FIG. 4, some embodiments of the invention provide parallel destinations that can be automatically accessed by users with clients 204 when they visit websites of partners 230. Accordingly, rather than overlaying or embedding virtual goods and/or on-line services together with normal website content, web page 400 having this parallel destination content completely fills the screen and replaces normal web site content of partner 230, or is provided in a separate browser window, for example. Within this parallel destination, virtual objects can be provided, including avatars 402, virtual collectibles 404, games or activities 406 and on-line services 408, as described above. It should be noted that parallel destinations as provided in web page 400 can also include displays of some or all of the content typically provided in websites.

It should be noted that parallel destinations can be similar to virtual spaces, worlds and rooms as described in the commonly owned patent, and can be customized by personnel of partner sites 230, by the users, or by system administrators. The parallel destinations can be overlaid on top of website contents, or else accessed through websites. Users may visit parallel destinations of partner sites 230, possibly in accordance with preference settings configured by the user. Access to the parallel destinations can also be permission-based, and the users may be restricted from visiting according to some pre-set system configurations. Moreover, as described in the commonly owned patent, the present invention can enable user interactions such as chat messages 410 that are entered by users having clients 204 in text box 412, and appear adjacent to their respective avatars 402.

Figure 5:
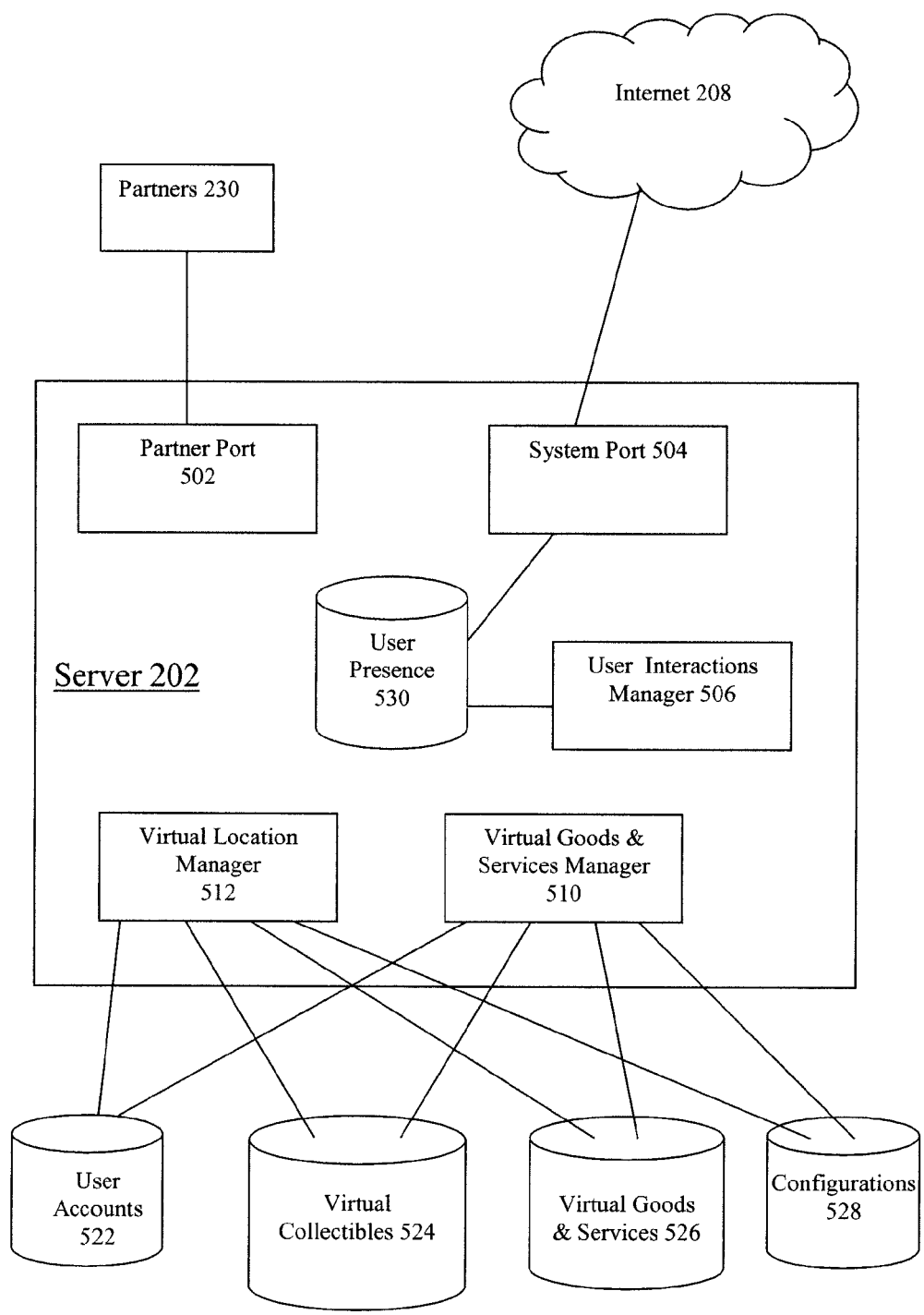
FIG. 5 is a detailed block diagram of an example implementation of a server in a virtual location-based services system according to aspects of the invention.

An example implementation of server 202 that is adapted to provide virtual location-based goods and services, including embodiments of such goods and services described above in connection with FIGS. 3 and 4 for example, is illustrated in further detail in FIG. 5.

As shown in FIG. 5, server 202 in some embodiments of the present invention includes partner port 502, system port 504, user interactions manager 506, virtual location manager 512, virtual goods and services manager 510, and user presence 530. Some or all of processes 502, 504, 506, 510 and 512, as well as presence storage 530 communicate with each other over a bus, local or other network (not shown), shared memories, inter-process communications and/or network protocols and can be partially or fully implemented as web applications and/or web server applications, as will be understood by those skilled in the art after being taught about their functionalities described in detail herein and in the commonly owned patent.

As further shown in FIG. 5, server 202 can include one or more processes for managing structured or unstructured data including user accounts 522, virtual collectibles 524, virtual goods and services 526, and virtual space configurations 528. In one example implementation, data 522, 524, 526 and 528 are provided in one or more common or separate databases that can be either internally or externally stored. It should be noted that storage 530 is shown as provided within server 202 to illustrate a typical configuration where such information is dynamically maintained and used by one or more processes 502, 504, 506, 510 and 512 but is not permanently recorded. However, this is just one example, and certain or all of such information can also or alternatively be maintained in internal or external storage that is more persistent.

In general, system port 504 handles communications with clients 204, typically hosted on devices such as PCs. Server 202 can also include the same or separate ports for handling communications with clients 204 hosted on devices such as cell phones and PDAs. It should be apparent that these need not be separate processes, but can be provided together in alternative embodiments.

In general operation, port 504 operates to communicate with clients 204 using structured messaging as defined for the appropriate client type, allowing for interaction with server 202 in order to provide virtual goods and services to users with clients 204 according to configurations 528. In one PC example, clients 204 use http methods such as the POST method over TCP/IP and sockets to send information about URLs browsed by web browser 205 to server 202 via port 504. These and other example implementation details are described in detail in the commonly owned patent and/or will become apparent to those skilled in the art based on the following descriptions.

User interactions manager 506 manages sessions and interactions between users having clients 204. For example, manager 506 maintains text chat sessions between several users who may be graphically and textually interacting with each other in a virtual space (e.g. chat room) via avatars, etc. Manager 506 can also manage interactions using additional on-line services that are provided according to the invention (e.g. voice chat, bulletin boards, etc.), as will become more apparent from the descriptions herein. It should be apparent that there can be many virtual spaces that are active in the system at any given time, with many users participating in each, as managed by manager 506 according to information stored in storage 530. According to aspects of the invention, possibly depending on configurations stored in 528, and possibly further depending on user preferences stored in accounts 522, all users that are currently visiting the site of a partner 230 are automatically grouped by manager 506 in a chat group associated with the partner site, and are allowed to chat with each other.

In operation, clients 204 capture text, mouse clicks and other communications and actions from users interacting with controls (e.g. text boxes, buttons, hyperlinks, etc.) provided by clients 204 and send this information to server 202 and port 504. User interactions manager 506 manages the relay of such communications to the intended other users via their respective clients 204 and port 504. Those skilled in the art will be able to understand how to implement manager 506 after being taught by the present specification, as well as the commonly owned patent.

As further shown in FIG. 5, user presence information 530 (i.e. whether users are currently on-line and/or available for communications, what web site they are currently visiting, lists of users currently visiting a virtual parallel destination of partner 230 etc.) is dynamically maintained based on user interactions with server 202 via port 504. Manager 506 accesses this information, and may further maintain other user interaction information such as current active virtual spaces and chat session information, in storage 530 in connection with these user interactions. It should be appreciated that processes in server 202 other than module 506 can also access and/or maintain information in storage 530. It should be further noted that the invention is not limited to providing text conversations between users, but that conversations can include video, audio and other network communications functionality as well as interactive functionality such as gift giving and receiving, trading items between users, initiation emotes, avatar animations, and object manipulations, etc., provided either within server 202, or using other functionality outside server 202.

In general, server 202 processes information from port 504 using processes 510 and 512 to provide virtual goods and services based on the users' virtual location and configurations 528, as described in more detail below.

In embodiments, virtual location manager 512 determines how and when to provide virtual goods and services to users. Virtual location manager 512 accesses configurations 528 to make its determinations. For example, as shown in Table 1 below, configurations 528 can provide a list of URLs, and virtual goods and services corresponding to the URLs, as well as criteria about how the corresponding virtual goods and services can be made available to users. Accordingly, when a user having a client 204 visits a website, the URL is sent to server 202. Manager 512 determines whether the URL is listed in configurations 528, and if so, manager 512 can further determine whether criteria associated with the URL are met.

TABLE 1

| Rule | URL | Virtual Good/Service | Criteria |
| --- | --- | --- | --- |
| 1 | www.ford.com | Checkers Game Ford Spaceship | Everyone Winner of game |
| 2 | www.gap.com | Parallel Destination, including fashion show objects and model avatars | Users configured to allow |
| 3 | www.olympics.com | Collect virtual Olympic pins by visiting the athlete's web page | Registered users |

TABLE 1-continued

| Rule | URL | Virtual Good/Service | Criteria |
|---|---|---|---|
| 4 | All websites associated with concert | Trade virtual concert swag and music | Concert ticket holders only |
| ... | ... | ... | ... |
| N | www.coke.com | Coke bottles to be used in squirt game | Users who choose to participate in the game |

As shown in the examples of Table 1, in the first entry, if a user visits www.ford.com, and this activity is reported by a client 204 to server 202, manager 512 will determine that this URL matches this entry. Accordingly, it will interact with client 204 through port 504 to cause a checkers game to be rendered on top of the other content provided by web servers associated with www.ford.com. As further shown in this first entry, the winner of the game (it can be played against other users' avatars, or against the computer, for example), will be awarded a spaceship Virtual Collectible. Accordingly, the users' game activities can be managed by manager 506, and manager 512 can further monitor this information to determine if and when the user wins the checkers game, and if so, provide the Virtual Collectible from store 524 to the user, in a manner described herein and in the commonly owned patent.

Referring back to Table 1, in the second entry, if a user visits www.gap.com, and this activity is reported by a client 204 to server 202, manager 512 will determine that this URL matches this entry. As further seen, manager 512 will then check the user's own preferences stored in account info 522, for example, including information determining if and how parallel destinations are to be displayed. If the user has configured them to be displayed in these circumstances, manager 512 will interact with client 204 through port 504 to cause content associated with the parallel destination to fill the contents of the user's browser screen and completely replace the regular content of www.gap.com. As shown in this example, the content of the parallel destination can include a virtual fashion show with model avatars.

As further shown in Table 1, any user who purchases a ticket for a concert can go online and collect virtual swag (virtual collectible, like T-shirts the user's avatar can wear) from various websites that are music related, such as websites of music bands participating in the concert. Users who complete the collections can download special music from the concert. For example, after the user purchases a ticket online from a partner website, the user is taken to a special URL where the user is given a key/token that enables the user to participate in this activity. The user can also be provided with the list of participating websites.

It should be noted that the invention is not limited to the above examples, but further aspects of virtual goods and on-line services that can be provided in accordance with the invention will become apparent to those skilled in the art after being taught by the present specification.

In an example where configurations are based on URLs visited by users, these URLs can contain wild cards to accommodate random-generated and ranges of URLs. For example, an entry may exist in the pool where "www.amazon.com/userid=*/shop.php," where the asterisk can be replaced by any string. This eliminates the need to store thousands of similar URLs.

Conversely, certain virtual goods and services can be tied to specific URLs (e.g. the specific URL of a video clip providing a demonstration of or advertisement for a partner's product). Accordingly, the system can reward visitation to a specific URL by creating a rule in configurations 528 that associates only one specific URL with a virtual good and/or service. This provides the user with more incentive to visit a specific URL, and allows the user to be entertained when a virtual good and/or service is made available based on that visit.

It should be noted that configurations 528 can further specify what should happen if a corresponding URL is not found in a list such as Table 1. There are numerous possibilities as to what may happen: no Virtual Collectible may be distributed, a Virtual Collectible may be distributed one out of five times, or some other distribution rule may apply.

In embodiments, virtual services provided by server 202 can include games and other interactive objects, and virtual location manager 512 can provide rewards of other virtual goods and services such as Virtual Collectibles based on user interactions with such games and criteria set in configurations 528. For example, the system can track how many points certain groups of users accumulate (e.g. points associated with Virtual Collectibles distributed to users) over a certain time period and award an additional prize to the user who accumulates the most points. As another example, server 202 can declare a Combo of Virtual Collectibles that has a certain elevated point value for a limited time, and award those elevated point values during that limited time. It should be apparent that virtual location manager 512 can therefore include local or remote memory (not shown) for storing information regarding current and past games, as well as the rules for these games, to the extent they are not controlled by rules and criteria in storage 528.

As further shown in FIG. 5, server 202 in this example implementation of the invention includes partner port 502 and virtual goods and services manager 510.

Partner port 502 can provide a web-based or network interface for partners to access server 202, and for example certain of the functionalities of virtual goods and services manager 510, to be described in more detail below. Port 502 can provide authentication mechanisms for securely accessing server 202 and/or manager 510. Although shown separately, it should be apparent that ports 502 and 504 can be implemented partially or fully together.

In general, virtual goods and services manager 510 allows configuration of the virtual goods and services provided to users by the system of the invention, and the association of goods and services with partners 230. For example, manager 510 can access, store or configure virtual goods and services in database 526. Manager 510 can further access, store or configure Virtual Collectibles in database 524. Manager 510 can also access, store or change configurations in database 528, including activities defined by rewards criteria as described above, and associate Virtual Collectibles to be associated with rewards. Although shown separately for clarity of the invention, databases 524 and 526 can be combined in some embodiments.

Partner access to virtual goods and services manager 510 via port 502 can be provided using well-known web server techniques and web pages and controls, such as Flash, HTML, XML, CGI scripts, Active X, C++, Java, JavaScript, and the like. Those skilled in the art will be able to understand how to implement such interfaces and controls after being taught by the present disclosure. It should be further noted that in addition or alternatively to providing port 502 for partners, that some or all of the functionality to access, store or configure virtual goods and services in database 524, and to access, store or configure rules and/or rewards configurations associated with virtual goods and services in database 528, can be done manually or through an administrator or other interface.

Returning to FIG. 5, and as described in more detail in the commonly owned patent, Virtual Collectibles (including or in addition to other virtual world objects such as planets, backgrounds, etc.) are stored in database 524 as pointers to one or more objects that may contain animations, sound, graphics and specific functionality within a game or rules-based system. Virtual Collectibles can be as simple as graphics files. For example, a Virtual Collectible could be a .GIF, .JPG, .BMP or .PNG file corresponding to a static image when rendered on a host computer. Virtual Collectibles can further or alternatively include an animation file, such as an animated .GIF file or a Flash animation. Virtual Collectibles can also further or alternatively include any sort of media file, including any type of audio or movie file, such as MP3, .AVI, .SWF, .MPG, WMV, .WAV, etc. In such cases, content associated with Virtual Collectibles can typically be downloaded or streamed to users via port 502 and clients 204 via conventional protocols such as http and rendered on hosts using conventional browser functionality and/or functionality in optional multimedia players such as Flash.

In the present invention, virtual goods and services (e.g. interactive objects such as puzzles, mazes, animations such as weapons or other objects targeted at a user's avatar, etc.) are stored and maintained in database 526 in much the same manner as Virtual Collectibles are stored in database 524 and in some respects can be considered Virtual Collectibles themselves. Pointers to these objects can be stored configurations 528 and used by manager 512 to control user interactions and experiences within games hosted by the system through port 504. Those skilled in the art will recognize how to implement the games and activities according to the principles of the invention after being taught by the above examples, and the teachings of the commonly owned patent.

It should be noted that Virtual Collectibles provided for personal retention by users can be similar to certain virtual goods and services maintained in database 526 and temporarily provided to users by manager 512. For example, they can be as sophisticated as a programmable bot or application, such as a trivia game, mini-game, interactive pet, or bot endowed with artificial intelligence. In this case, the Virtual Collectibles may come with a client-server architecture of their own included in, or in addition to port 504, or they may plug into the client-server framework of a larger game or application provided in server 202 and/or downloaded to client 204. For example, the Virtual Collectible could include a Flash game or a Java game, or a Java servlet, or a C++ game, or an Active X control, etc.

It should be appreciated that modules 510 and 512 are shown separately for clarity of the invention, and to underscore how they differ in functionality, and how they coordinate with each other. For example, the descriptions of module 510 are intended to underscore how embodiments of the invention manage and configure the distribution of virtual goods and services, while 512 manages the server's actions in accordance with users' specific virtual locations. For example, module 510 configures the virtual goods and services and/or parallel destinations associated with specific URLs, and further allows for the configurations of how and when they are to be provided to users. These configurations are stored by module 510 in configurations 528. Manager 512 monitors the user interactions reported by port 504 and/or manager 506 and uses the configurations 528 to provide access to virtual goods and services 526 and/or virtual collectibles 524. In other words, when 512 determines the user interaction in the URL or parallel destination meet a set requirements, 512 will distribute the configured goods and services It should be further appreciated that different divisions, and combinations of these and other functionalities can be provided by one or more modules in different embodiments of the invention.

It should be noted that server 202 preferably includes an administrator interface (not shown) and associated functionality to manage various aspects and operations of the system. For example, server 202 can allow an administrator to upload and change virtual goods and services such as Virtual Collectibles, their attributes, and rules for distribution, including creating and initiating games to be played by users with clients 204. Server 202 can further allow an administrator to change and configure web pages, parallel destinations and other content served by the http server.

It should be further noted that in alternative embodiments server 202 need not include all the components and functionality shown in FIG. 5, or can include other server and/or network components and functionality not shown in FIG. 5, such as load balancers, firewalls, switches, gateways, etc. Moreover, those skilled in the art will appreciate that server 202 and/or certain or all of the components shown in FIG. 5 can be implemented by several different computers, either locally or remotely located, and communicating with each other via a bus, network, etc. It should be still further noted that server 202 can include functionality described in commonly owned patent, to the extent not detailed herein.

Figure 6:
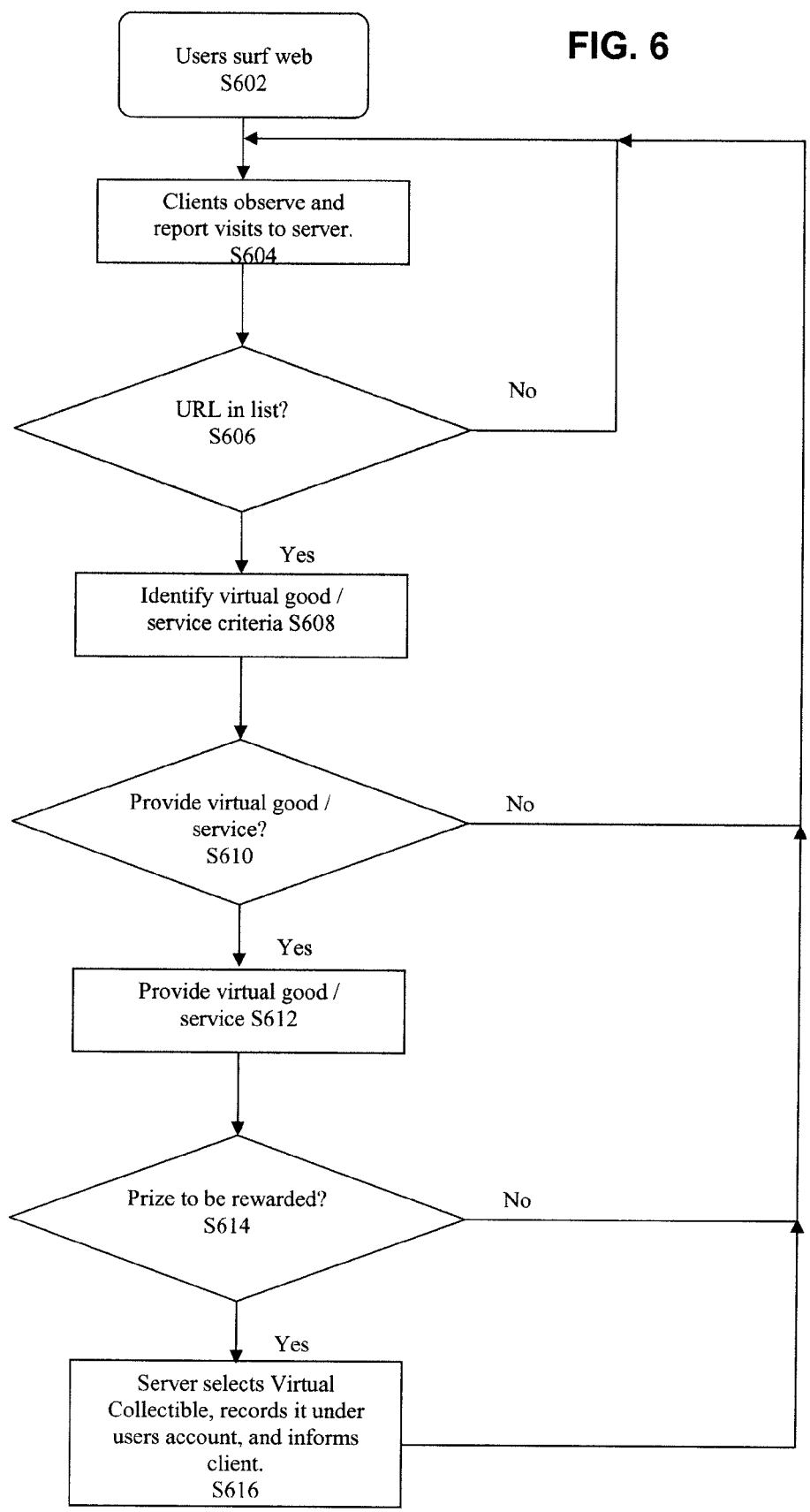
FIG. 6 is a flowchart illustrating an example method for providing virtual location-based services and goods that can be implemented in a system according to aspects of the invention.

FIG. 6 is a flowchart showing an example process that can be implemented by server 202 to provide virtual goods and services to users based on their virtual locations and/or online activities with partners.

As shown in FIG. 6, in step S602 a user surfs the web as usual. In step S604, when a user visits a new URL, the client 204 notes this activity and transmits this information to the server 202. For example, client 204 can monitor whenever a new URL is typed into browser 205, or when a link to a URL having a different domain name than the current page is clicked. The client 204 may also maintain a memory of the last known URL visited and use that to compare to the new URL. The new URL is transmitted by client 204, along with other information such as the user's identity, to port 504 using http methods and TCP sockets, for example. It should be appreciated that this communication can take place without the user's awareness.

In step S606, virtual location manager 512 of server 202 compares the URL against its list of configurations in store 528 to look for a match. If there is a match, processing advances to step S608 where the server reviews the criteria in the matching rule to determine what, if any, virtual good and/or service to make available to the user. Next, in step S610, manager 512 can further compare the identified criteria to the user's interactions, settings, etc. to determine whether to provide the virtual good and/or service. For example, depending on the user's preferences, as stored in accounts 522 for example, manager 512 can determine whether or not the user wishes to enter a parallel destination provided by the partner associated with the matching URL. Additionally or alternatively, manager 512 can further monitor user interactions via manager 506 to determine whether to provide a virtual good and/or service. For example, an avatar associated with a partner site that the user is visiting can ask the user whether they want to play a game, and manager 512 can monitor the response via manager 506 and port 504.

If the criteria allows, the virtual good and/or service is provided in step S612. Otherwise processing returns to step S604. In step S612, manager 512 retrieves information regarding the associated virtual good and/or service(s) from store 526. For example, where the virtual good and/or service(s) is a graphical object in database 526, manager 512 can interact with clients 204 and port 504 to cause the object to be rendered on a host 206 associated with the user and overlaying content already rendered by browser 205 from the web server associated with the URL. As another example, if the virtual good and/or service(s) include a parallel destination, manager 512 can interact with clients 204 and port 504 to cause a new page to fill the screen of the browser 205 of a host 206 associated with the user and to further display other contents stored in database 524 and/or 526. As another example, if the virtual good and/or service(s) includes an on-line service, manager 512 can interact with clients 204 and port 504 to display content from database 524 and/or 526 associated with the service in a screen of browser 205 of a host 206 associated with the user, and manager 506 can manage user interactions associated with the service. Manager 512 can further receive information about such interactions and update the content associated with the service accordingly (for example, moving checkers in a checkers game).

If a virtual good and/or service is provided, processing continues to step S614 where manager 512 further identifies any criteria specifying whether on-line activity of the user should be monitored for providing a reward in addition to a virtual good and/or service. As set forth above, the rewards criteria can include a variety of parameters that are related to on-line activities that the virtual location manager 512 and/or client 204 can monitor. Manager 512 can further retrieve and consult the user's own account information in store 522 to determine whether the criteria are met. For example, where the provided service is a game, and criteria is a number of points scored in the game, in step S612 virtual goods and services manager 512 can receive information from user communications manager 506 regarding the user's interactions and points scored. Manager 512 can then use this information and compare it to threshold minimums established in configurations 528 to determine whether the thresholds have been met or exceeded.

If manager 512 in step S614 determines that the criteria for the associated rule indicate that a Virtual Collectible should be awarded to the user, processing advances to step S616.

In step S616, manager 512 retrieves information regarding the associated Virtual Collectible from store 524, and further associates this information in the account for the user in store 522. For example, where the Virtual Collectible is stored as an object in database 524, manager 512 can add a pointer or object ID index to a list of Virtual Collectibles in the user's account information in database 526. Server 202 (e.g. through port 504) then communicates with client 204 to present the user with the Virtual Collectible and/or the option to accept or reject it. For example, server 202 can send data, text and/or multimedia content to client 204 and client 204 can correspondingly present a message on the host device's output component, such as a computer screen or a cell phone screen, or provide another indicator (e.g. a tone or buzz) indicating that a new Virtual Collectible is available for the user. Note that in some embodiments, the user need not immediately view the Virtual Collectible, although the user can have the option to view the Virtual Collectible by setting the user's preferences accordingly. If a user so chooses, the user can automatically view the Virtual Collectible upon receipt, or in response to a user selection such as a mouse click, etc. The actual processes and mechanisms that are used to enable a user to view and or perceive the Virtual Collectible awarded to the user are described in more detail in the commonly owned patent.

It should be noted, though not shown in FIG. 6, in some embodiments, even when a URL visited by the user is not included in a list of URLs in configurations 528, optional additional processing may be performed to determine whether a virtual good and/or service(s) should still be provided to the user. If so, similar processing as described above in connection with steps S610 and S612 can be performed.

Figure 7:
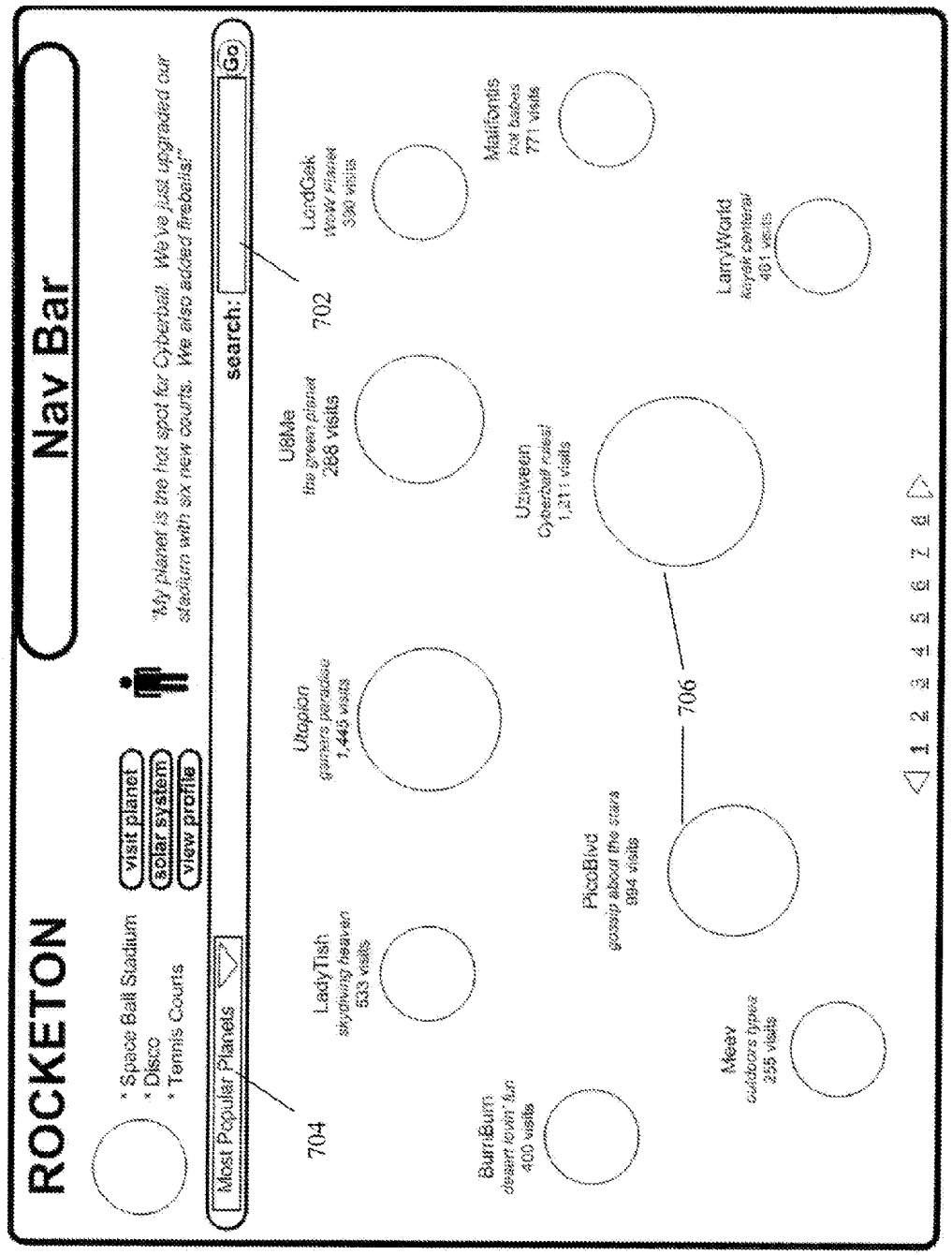
FIGS. 7 and 8 are screenshots illustrating further aspects of parallel destinations that can be provided by a system in accordance with embodiments of the invention.
Figure 8:
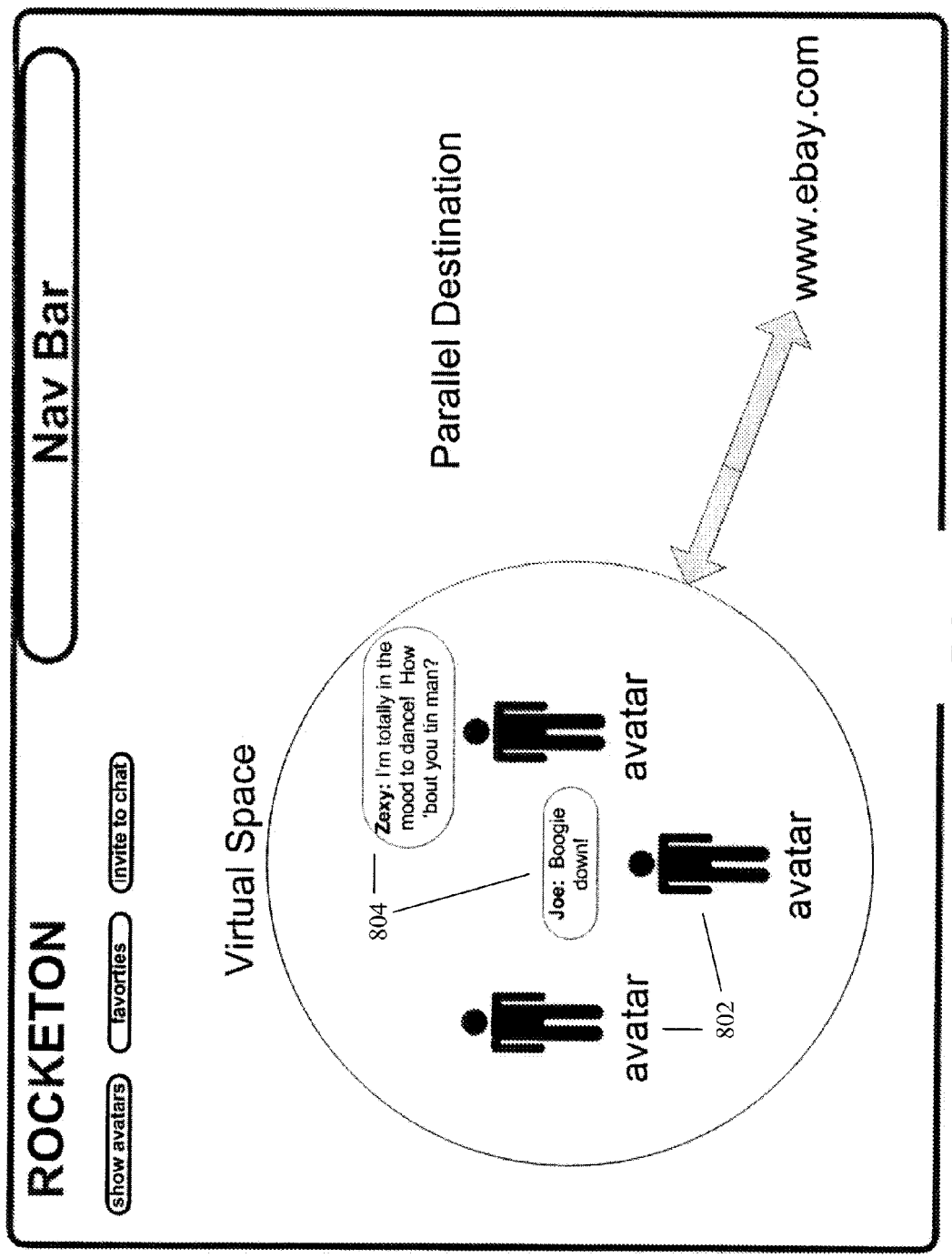

Certain additional aspects and implementation possibilities according to embodiments of the invention are shown in FIGS. 7 and 8. These examples relate to services that are provided in separate screens (e.g. new browser windows that are launched) from regular website content, rather than overlaying or embedding normal website content in a common browser window.

FIG. 7 is a screenshot illustrating an additional or alternative mechanism for allowing users to access parallel destinations of partner sites 230 according to embodiments of the invention. As shown in FIG. 7, a user can search for virtual worlds, and these can include virtual worlds associated with partner sites 230, such as parallel destinations described above. For example, a user can enter a keyword in text box 702 for the virtual world associated with a specific site or person of interest. The user may also be provided a control 704 that allows a specific type or set of parallel destinations to be selected such as "Most Popular Planets" in the example shown in FIG. 7, which results in icons 706 of the corresponding destinations to be displayed on the screen. By clicking on the associated icon 706, the user can enter the desired parallel destination.

FIG. 8 is a screenshot illustrating an example of a parallel destination and how users can interact within it. In this example, the parallel destination is a virtual world associated with ebay.com and can include virtual objects and chat functionality as described in the commonly owned patent. As shown, users with associated avatars 802 can converse with each other using text chat messages 804 that are displayed adjacent to their avatar. As further shown in this example, the virtual space associated with www.ebay.com is displayed in a full window that is separate from and/or replaces regular website content (although it is also possible to be overlaid on top of regular website content in other examples). Moreover, it can include other virtual objects, goods and services (not shown) that users can interact with and/or view, which can include branded objects, virtual storefront, virtual goods for auction, games, interactive objects, interactive characters, etc. Still further, it can include other content and/or controls that allow users to access regular website content of the associated site.

It should be apparent that the invention thus enables advertisers and companies to more effectively advertise and promote their goods and services via the Internet. Meanwhile, in addition to allowing users to be entertained by receiving a virtual good and/or service merely by surfing the web at their own leisure, the companies associated with the online activities performed by the user, and for which the user was rewarded with a virtual good and/or service, can be positively remembered by the user. Still further, based on the experience of receiving a virtual good and/or service at the company's web site, the user may be more inclined to (a) visit the company's web site often, and (b) purchase goods or services from the company.

The example implementations described above should be considered illustrative rather than limiting, and many combinations, divisions, deletions, alterations and supplementations even within the above described implementations are possible, as should become apparent to those skilled in the art.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
monitoring a user's selection of a virtual location on the World Wide Web via a browser application, the virtual location being selected by the user from among a plurality of different websites on the World Wide Web;
causing a client application that is separate from the browser application on a computing device of the user to communicate with a server in response to the user's selection of the virtual location;
serving content associated with a game to the user's computing device from the server using the separate client application; and
interacting with the user via the separate client application to allow the user to play the game,
wherein the plurality of different websites have a respective plurality of URLs, the method further comprising:
storing the URLs of the websites in a predetermined list of URLs; and
associating identifiers of the game with the URL of the website associated with the selected virtual location in the predetermined list of URLs,
wherein the serving step includes comparing the URL of the selected virtual location with the contents of the predetermined list, and obtaining the identifiers of the game by matching the URL of the selected virtual location with the URL of the associated website.

2. A method according to claim 1, wherein the server is provided at a location on the World Wide Web that is separate from the selected virtual location.

3. A method according to claim 1, wherein the step of serving content associated with the game includes overlaying content associated with the game on top of content served from the selected virtual location in a window of the web browser.

4. A method according to claim 1, wherein the step of serving content associated with the game includes providing content separately from the content served from the selected virtual location.

5. A method according to claim 1, further including providing a virtual good based on the selected virtual location, and associating the virtual good with an account of the user.

6. A method according to claim 1, wherein the step of serving content associated with the game includes allowing the user to play the game using game piece objects that are rendered using content that is separate from content associated with the selected virtual location.

7. A method according to claim 1, wherein the comparing is performed by the server before serving the content associated with the game and in response to receiving the communication from the client application.

8. A method according to claim 1, wherein the step of serving content associated with the game includes allowing the user to chat with other users who are simultaneously at the same selected virtual location.

9. A method according to claim 8, wherein the step of serving content associated with the game further includes causing avatars corresponding to the user and other users to be rendered on computing devices associated with the users.

10. A method according to claim 1, wherein the step of serving content associated with the game further includes causing avatars corresponding to the user and other users to be rendered on computing devices associated with the users.

11. A method according to claim 10, wherein the step of serving content associated with the game includes allowing the user to chat with the other users.

12. A method according to claim 1, further comprising configuring the user's computing device to include the client application separate from a standard web browser on the user's computing device, and further configuring the client application to report browser activities to the server.

13. A method according to claim 12, wherein configuring includes configuring the client application as a browser plug-in application.

* * * * *